United States Patent
Fan et al.

(10) Patent No.: US 10,885,303 B2
(45) Date of Patent: Jan. 5, 2021

(54) OPTICAL FINGERPRINT SENSING MODULE

(71) Applicant: Egis Technology Inc., Taipei (TW)

(72) Inventors: Chen-Chih Fan, Taipei (TW);
Tong-Long Fu, Taipei (TW);
Yu-Hsiang Huang, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 37 days.

(21) Appl. No.: 16/509,357

(22) Filed: Jul. 11, 2019

(65) Prior Publication Data

US 2020/0026898 A1 Jan. 23, 2020

Related U.S. Application Data

(60) Provisional application No. 62/700,998, filed on Jul. 20, 2018.

(30) Foreign Application Priority Data

Nov. 23, 2018 (CN) .......................... 2018 1 1406948

(51) Int. Cl.
*G06K 9/00* (2006.01)
*H04N 5/225* (2006.01)

(52) U.S. Cl.
CPC ......... *G06K 9/0004* (2013.01); *H04N 5/2253* (2013.01); *H04N 5/2254* (2013.01)

(58) Field of Classification Search
None
See application file for complete search history.

(56) References Cited

U.S. PATENT DOCUMENTS

| 9,829,614 B2 | 11/2017 | Smith et al. |
| 2005/0166957 A1 | 8/2005 | Imoto et al. |
| 2007/0109438 A1 | 5/2007 | Duparre et al. |

(Continued)

FOREIGN PATENT DOCUMENTS

| CN | 206657363 U | 11/2017 |
| CN | 107480579 A | 12/2017 |

(Continued)

OTHER PUBLICATIONS

China Patent Office, Office Action, Patent Application Serial No. 201811406948.1, dated Oct. 28, 2020, China.

*Primary Examiner* — Duane N Taylor, Jr.

(57) ABSTRACT

An optical fingerprint sensing module for sensing a fingerprint pattern of a finger placed on an upper surface of a display panel module is provided, wherein light is generated by the display panel module and reflected by the finger. The optical fingerprint sensing module includes a substrate, an image sensor disposed above the substrate, a collimating layer disposed above the image sensor, a light permeable layer disposed above the collimating layer, and a pinhole layer disposed above the light permeable layer. The collimating layer has a plurality of collimating holes, and the pinhole layer has a plurality of pinholes, wherein the number of collimating holes is greater than the number of pinholes. Light is reflected by the finger and then sequentially propagates through the pinholes, the light permeable layer, and the collimating holes to reach the image sensor.

14 Claims, 5 Drawing Sheets

(56) References Cited

U.S. PATENT DOCUMENTS

| | | | |
|---|---|---|---|
| 2016/0132712 A1* | 5/2016 | Yang | G06F 3/044 |
| | | | 348/77 |
| 2017/0220844 A1 | 8/2017 | Jones et al. | |
| 2017/0286743 A1* | 10/2017 | Lee | G02B 5/201 |
| 2018/0081098 A1* | 3/2018 | Smith | G02B 27/30 |

FOREIGN PATENT DOCUMENTS

| | | |
|---|---|---|
| CN | 107799541 A | 3/2018 |
| CN | 107844767 A | 3/2018 |

\* cited by examiner

OPTICAL FINGERPRINT SENSING MODULE

CROSS REFERENCE TO RELATED APPLICATIONS

This application claims the benefit of U.S. Provisional Application No. 62/700,998, filed on Jul. 20, 2018, and claims priority of China Patent Application No. 201811406948.1, filed on Nov. 23, 2018, the entirety of which are incorporated by reference herein.

BACKGROUND OF THE INVENTION

Field of the Invention

The application relates in general to a fingerprint sensing module, and in particular, to an under-display fingerprint image sensing module.

Description of the Related Art

Biological identification technology has become increasingly mature, and different biological features can be used to identify individual users. Since the recognition rate and accuracy of fingerprint identification technology are better than those of other biological-feature identification technologies, fingerprint identification and verification are used extensively in various areas.

Fingerprint identification and verification technology detects a user's fingerprint pattern, captures fingerprint data from the fingerprint pattern, and saves the fingerprint data to the memory as a template, or directly saves the fingerprint pattern. Thereafter, the user presses or swipes a finger on or over the fingerprint sensor so that a fingerprint pattern is sensed and fingerprint data is captured, which can then be compared against the template or the stored fingerprint pattern. If the two match, then the user's identity is confirmed.

In the technical field of the under-display type fingerprint image sensing modules, light cross-talk often occur due to the height limitation of the collimators, so that the quality of the images captured by the image sensor may be reduced. Therefore, it has become a challenge to reduce or eliminate light cross-talk when the height of the collimators is limited inside the optical fingerprint sensing modules.

BRIEF SUMMARY OF INVENTION

In view of the aforementioned problems, an object of the invention is to provide an optical fingerprint sensing module for sensing a fingerprint pattern of a finger placed on an upper surface of a display panel module, wherein light is generated by the display panel module and reflected by the finger. The optical fingerprint sensing module includes a substrate, an image sensor disposed above the substrate, a collimating layer disposed above the image sensor, a light permeable layer disposed above the collimating layer, and a pinhole layer disposed above the light permeable layer. The collimating layer has a plurality of collimating holes, and the pinhole layer has a plurality of pinholes, wherein the number of collimating holes is greater than the number of pinholes. Light is reflected by the finger and then sequentially propagate through the pinholes, the light permeable layer, and the collimating holes to reach the image sensor.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The embodiments of making and using the optical fingerprint sensing modules are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
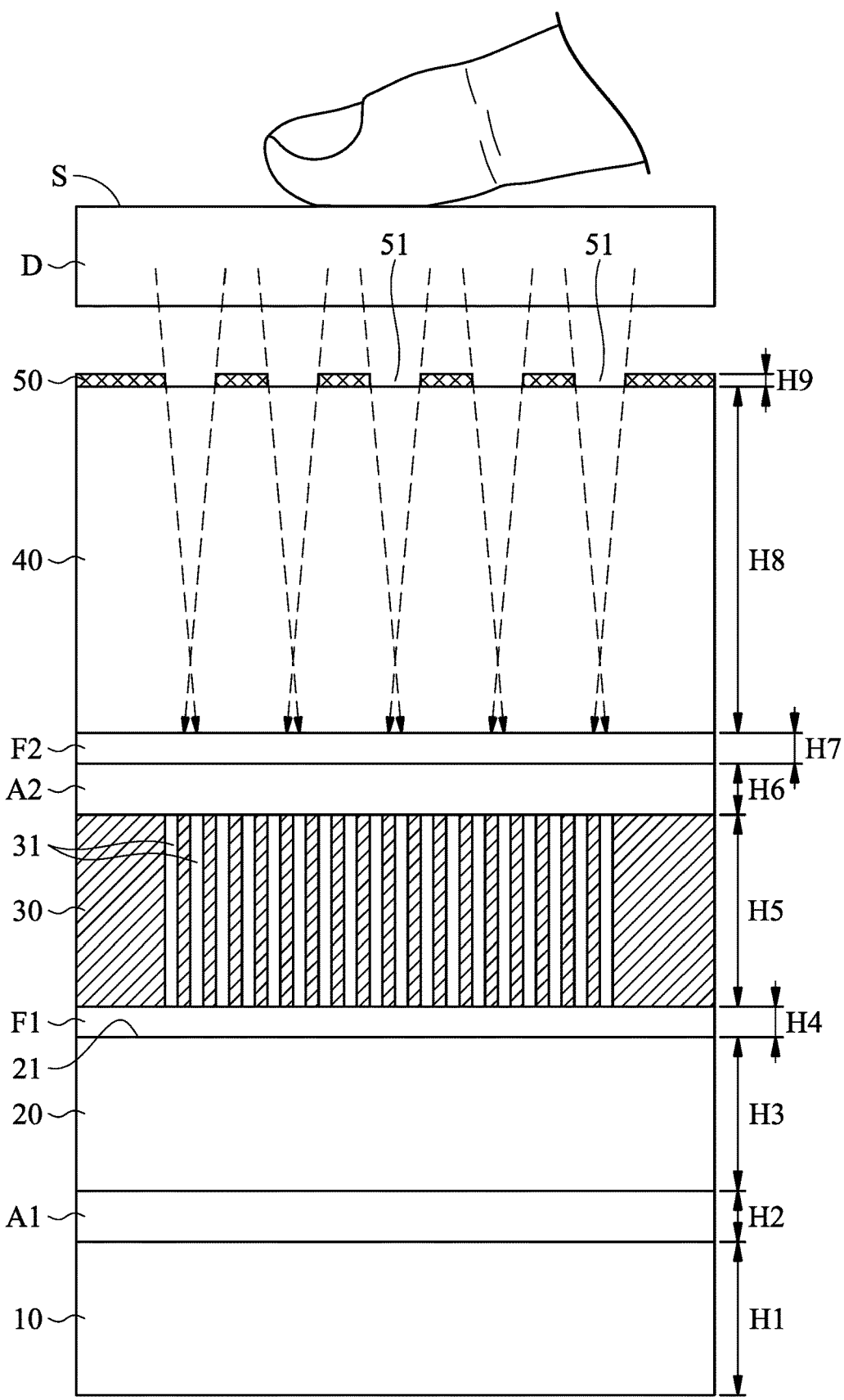
FIG. 1 is a schematic diagram of an optical fingerprint sensing device in accordance with an embodiment of the invention.

FIG. 1 is a schematic diagram of an optical fingerprint sensing device in accordance with an embodiment of the invention. As shown in FIG. 1, the optical fingerprint sensing device in this embodiment can be used to sense a fingerprint pattern of a finger. The optical fingerprint sensing device primarily comprises a substrate 10, an image sensor 20, a collimating layer 30, a light permeable layer 40, a pinhole layer 50, and a display panel module D. The image sensor 20 is disposed above the substrate 10, and the image sensor 20 is affixed to the substrate 10 via a connection layer A1. It should be noted that the structure under the display panel module D may constitute an optical fingerprint sensing module (at least including the substrate 10, the image sensor 20, the collimating layer 30, the light permeable layer 40, and the pinhole layer 50).

In some embodiments, the image sensor 20 may comprise Charge Coupled Device (CCD) or CMOS Image Sensor (CIS) that includes a plurality of pixel units arranged in a matrix, and each of the pixel units comprises at least a photosensitive element. The substrate 10 may comprise a flexible printed circuit board that is electrically connected to the image sensor 20.

The connection layer A1 may comprise a die attachment film or adhesive paste that firmly connects the image sensor 20 to the substrate 10. In this embodiment, the height H1 of the substrate 10 is about 120 um, the height H2 of the connection layer A1 is about 20 um, and the height H3 of the image sensor 20 is about 120 um.

Still referring to FIG. 1, the collimating layer 30 is disposed above the image sensor 20, and an optical film F1 is disposed between the image sensor 20 and the collimating layer 30. The optical film F1 may be an infrared cut-off filter film or other optical filter layer, and the height H4 of the optical film F1 is about 6 um.

It should be noted that the collimating layer 30 is made of opaque material, and comprises a plurality of longitudinal collimating holes 31 arranged in a matrix. Here, the number of collimating holes 31 is greater than the number of pixel units in the image sensor 20. For example, each pixel unit of the image sensor 20 may correspond to two or more than two collimating holes 31 of the collimating layer 30.

In this embodiment, the height H5 of the collimating layer 30 is about 75 um, the diameter of the collimating holes 31 is about 5 um, and the distance between two adjacent collimating holes 31 is about 5 um. Hence, the ratio of height to diameter of the collimating holes 31 is about 15.

As shown in FIG. 1, the light permeable layer 40 is disposed above the collimating layer 30, wherein an optical film F2 and a connection layer A2 are disposed between the collimating layer 30 and the light permeable layer 40. In some embodiments, the connection layer A2 may comprise a transparent die attachment film or Optically Clear Adhesive (OCA) that firmly connects the optical film F2 to the collimating layer 30. Here, the height H6 of the connection layer A2 is about 20 um, the height H7 of the optical film F2 is about 6 um, and the height H8 of the light permeable layer 40 is about 402 um.

For example, the optical film F2 may be an infrared cut-off filter film or polarizing film. In some embodiments, the optical film F2 may be omitted from the optical fingerprint sensing device, and the connection layer A2 such as die attachment film or adhesive paste can directly connect the collimating layer 30 to the light permeable layer 40.

A pinhole layer 50 is disposed on an upper surface of the light permeable layer 40, wherein a plurality of pinholes 51 are formed in the pinhole layer 50 and arranged in a matrix. Specifically, the diameter of the pinholes 51 is greater than the diameter of the collimating holes 31, and the pitch of the pinholes 51 is greater than the pitch of the collimating holes 31.

For example, the pinhole layer 50 may comprise metal or black photoresist to block a part of light, wherein the thickness H9 of the pinhole layer 50 is from 1 um to 5 um, the diameter of the pinholes 51 is from 10 um to 20 um, and the pitch of the pinholes 51 is from 20 um to 50 um. In this embodiment, the thickness H9 of the pinhole layer 50 is about 5 um, the diameter of the pinholes 51 is about 20 um, and the pitch of the pinholes 51 is about 40 um.

In FIG. 1, the display panel module D is disposed above and spaced apart from the pinhole layer 50. Here, the display panel module D may be an Organic Light-Emitting Diode (OLED) display module, TFT-LCD module or touch display module.

It should be noted that the display panel module D comprises a sensing surface S for sensing a fingerprint pattern of a finger, and a plurality of light-emitting units (not shown) are disposed in the display panel module D to project light onto the finger that is placed on the sensing surface S. Light can be reflected by the finger and then bounce out of the lower surface of the display panel module D to enter the light permeable layer 40 via the pinholes 51 of the pinhole layer 50.

As mentioned above, the pinhole layer 50 comprises opaque metal or black photoresist to block a part of light from entering the light permeable layer 40. Hence, light can be efficiently converged and filtered since it enters the light permeable layer 40 only through the pinholes 51. Therefore, divergence of the light reflected from the finger can be prevented to reduce or eliminate light cross-talk in the image sensor 20.

After propagation through the pinholes 51 of the pinhole layer 50, light sequentially passes through the light permeable layer 40, the optical film F2, and the connection layer A2 and then enters the collimating holes 31 of the collimating layer 30. The collimating holes 31 can collimate light to propagate through the optical film F1 to reach the image sensor 20 in a vertical direction.

When the image sensor 20 receives light through the collimating holes 31 and the optical film F1, it converts light signals into electrical signals that include the fingerprint pattern information. Subsequently, the image sensor 20 can transfer the electrical signals to a processor (not shown) to perform data storage and biological identification of the fingerprint pattern.

Figure 2:
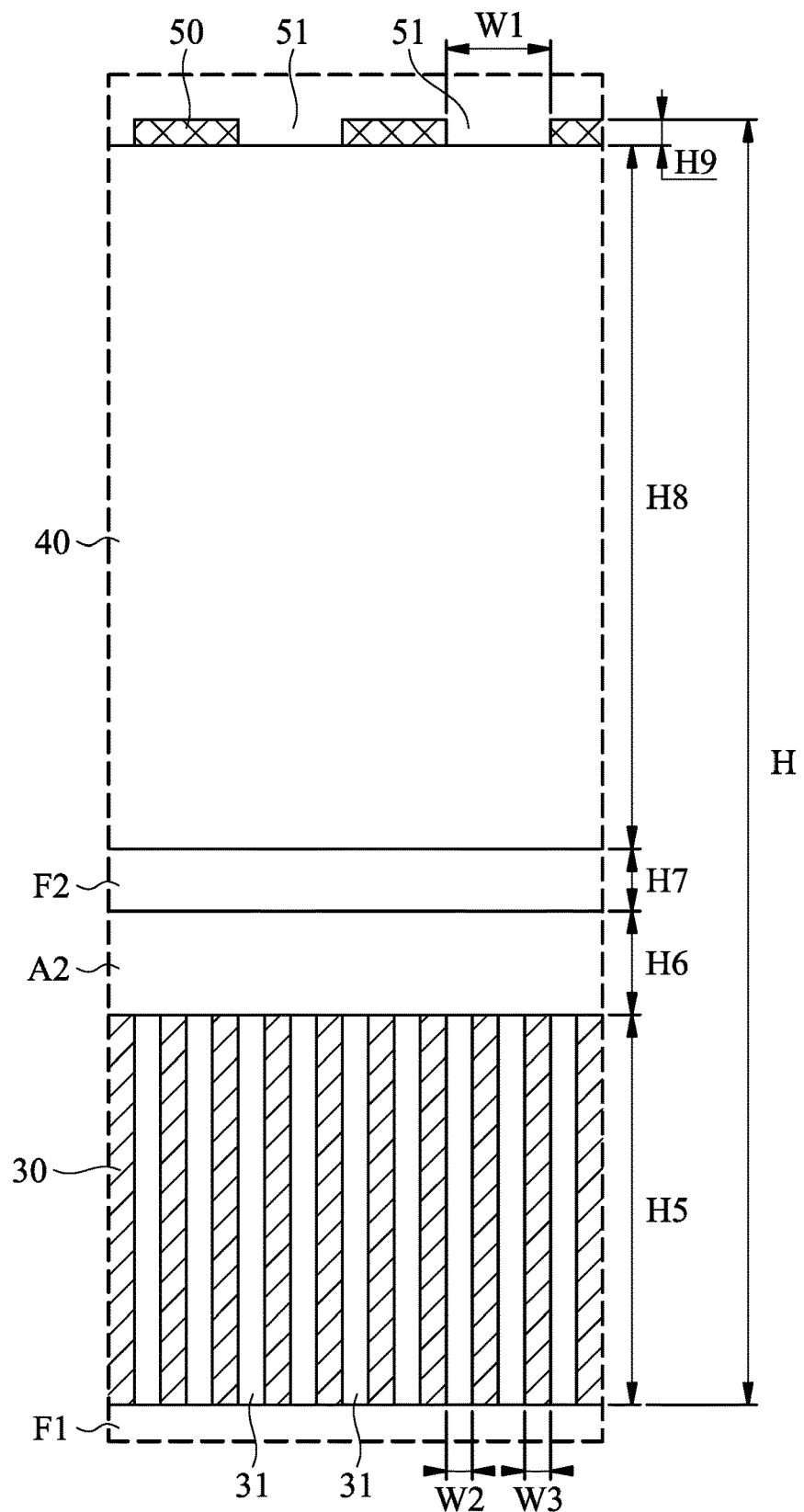
FIG. 2 is a partial enlarged view of the optical fingerprint sensing device in FIG. 1.

FIG. 2 is a partial enlarged view of the optical fingerprint sensing device in FIG. 1. As shown in FIG. 2, each pinhole 51 of the pinhole layer 50 has a diameter W1, and each collimating hole 31 of the collimating layer 30 has a diameter W2, wherein W1≥W2.

FIG. 2 also shows that the adjacent collimating holes 31 are spaced apart from each other by a distance W3, wherein W1=2(W2+W3). That is, each of the pinholes 51 in the pinhole layer 50 corresponds to two collimating holes 31 in the collimating layer 30, and the number of collimating holes 31 is greater than the number of pinholes 51. In this embodiment, the number of pinholes 51 corresponds to or equal to the number of pixel units in the image sensor 20, and the positions of the pinholes 51 correspond to the positions of the pixel units in the image sensor 20. For example, the pinholes 51 may be aligned to the pixel units of the image sensor 20, and each of the pinholes 51 is corresponding to one of the pixel units. The distance W3 between two adjacent collimating holes 31 may be greater than, equal to, or less than the diameter W2 of the collimating holes 31.

Referring to FIG. 2, a distance H is defined between the top surface of the pinhole layer 50 and the bottom surface of the collimating layer 30, wherein H=H5+H6+H7+H8+H9, and the ratio of H to H5 is from 5 to 8, and the ratio of H to W2 is from 80 to 120. In this embodiment, the ratio of H to H5 is about 6.8, and the ratio of H to W2 is about 100.

As the pinhole layer 50 is formed above the light permeable layer 40, and each of the pinholes 51 corresponds to at least two collimating holes 31, light can be efficiently filtered and converged to prevent serious cross-talk of light when entering the light permeable layer 40. Therefore, the quality of the image captured by the image sensor 20 can be improved, and the height H5 of the collimating layer 30 can be reduced, so as to simplify the manufacturing process and increase the production yield.

Figure 3:
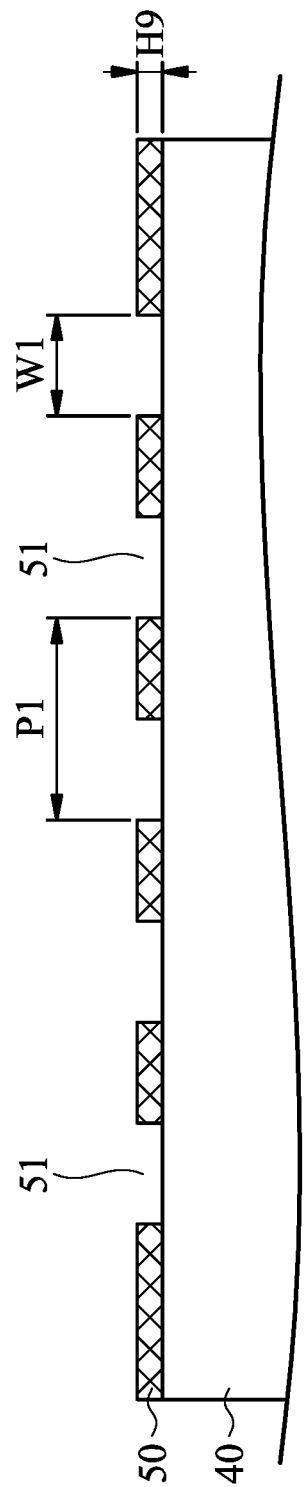
FIG. 3 shows a partial enlarged view of the pinhole layer 50 and the light permeable layer 40 in FIG. 1.

FIG. 3 shows an enlarged view of the pinhole layer 50 and the light permeable layer 40 in FIG. 1. Referring to FIG. 3, the pinhole layer 50 has a height H9, and each of the pinholes 51 has a diameter W1. Additionally, the pitch P1 of the pinholes 51 is from 20 um to 50 um, the ratio of W1 to H9 is from 2 to 20, and the ratio of P1 to W1 is from 2 to 5.

In some embodiments, the pinhole layer 50 may be formed on the surface of the light permeable layer 40 by semiconductor manufacturing processes, such as Chemical Vapor Deposition (CVD), evaporation, sputtering, coating, dispensing, electroplating, or electroless plating. As mentioned above, since the pinhole layer 50 comprises opaque metal or black photoresist to block a part of light from entering the light permeable layer 40, light can be efficiently converged when entering the light permeable layer 40, and serious cross-talk of light can be therefore prevented.

Figure 4:
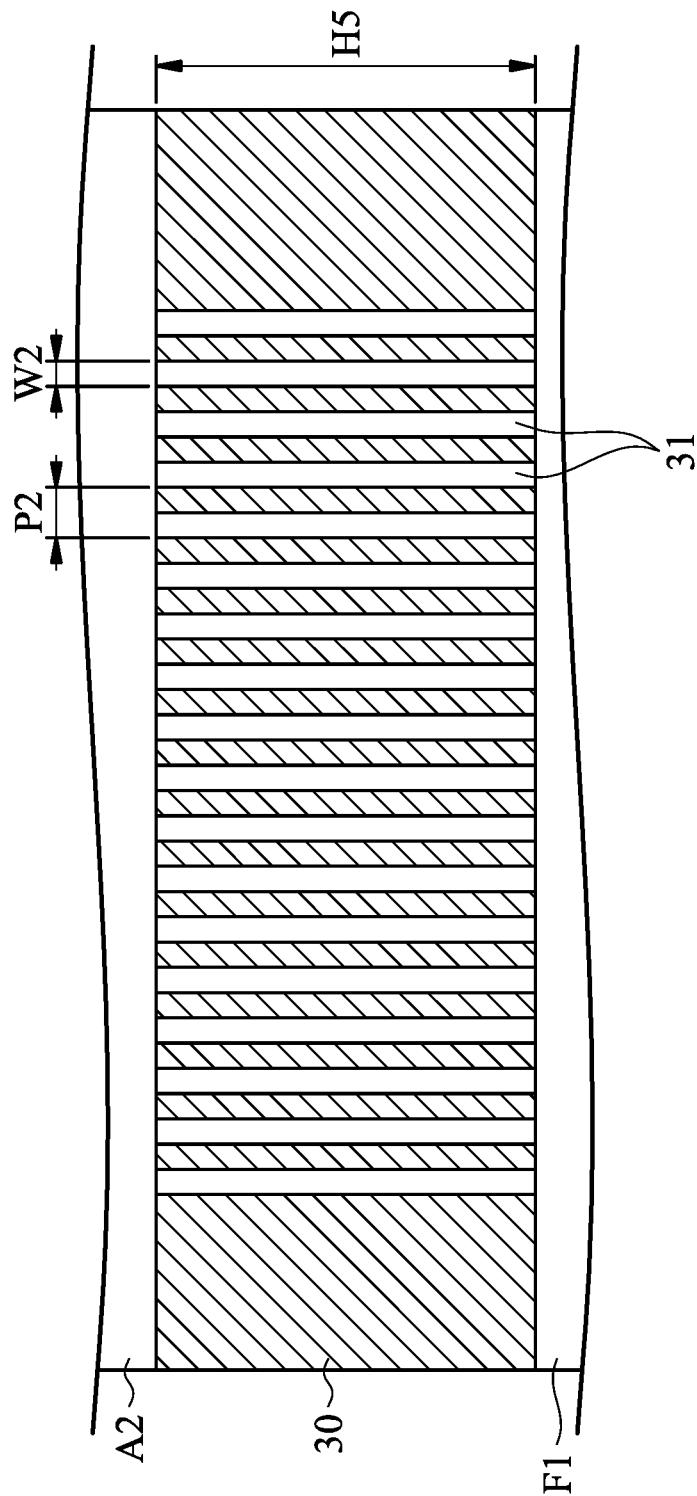
FIG. 4 shows a partial enlarged view of the collimating layer 30 in FIG. 1.

FIG. 4 shows an enlarged view of the collimating layer 30 in FIG. 1. Since the pinhole layer 50 above the light permeable layer 40 can converge the reflected light and block a part of the reflected light, the height of collimating holes 31 and the collimating layer 30 can be reduced. Therefore, the production yield can be improved, and the manufacturing cost and thickness of the fingerprint sensing module can also be reduced.

In this embodiment, the ratio of height to diameter of the collimating holes 31 is about 15, i.e. H5/W2=15. However, the ratio of H5 to W2 may also be ranged from 10 to 50 according to different functional requirements. Additionally, the pitch P1 of the pinholes 51 in the pinhole layer 50 is greater than the pitch P2 of the collimating holes 31 in the collimating layer 30. For example, the pitch P1 of the pinholes 51 may be an integral multiple of the pitch P2 of the collimating holes 31.

Figure 5:
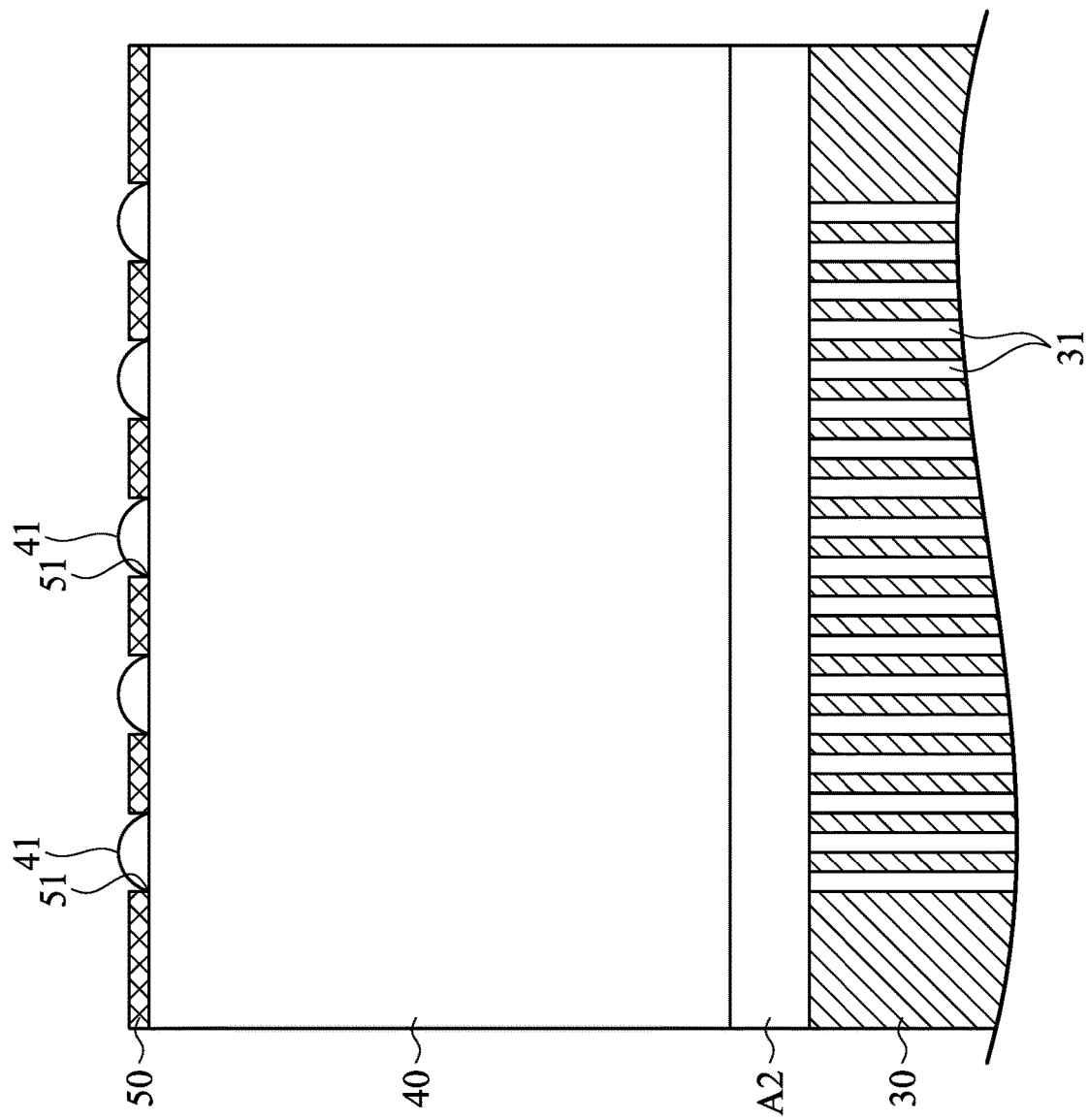
FIG. 5 shows a partial enlarged view of an optical fingerprint sensing device in accordance with another embodiment of the invention.

FIG. 5 shows a partial enlarged view of an optical fingerprint sensing device in accordance with another embodiment of the invention. The embodiment of FIG. 5 is different from that of FIG. 1 in that a plurality of micro-lenses 41 are formed on the upper surface of the light permeable layer 40, and the micro-lenses 41 are respectively received in the pinholes 51 of the pinhole layer 50.

As shown in FIG. 5, light reflected by the finger can propagate through the micro-lenses 41 in the pinholes 51 and then enter the light permeable layer 40. Here, the pinhole layer 50 and the micro-lenses 41 can converge the reflected light and block a part of the reflected light, so that serious cross-talk of light can be prevented when the reflected light enters the light permeable layer 40.

In summary, as the pinhole layer 50 is formed above the light permeable layer 40, and each of the pinholes 51 corresponds to at least two collimating holes 31, light can be efficiently filtered and converged so as to prevent serious cross-talk of light, whereby the quality of the image captured by the image sensor 20 can be improved, and the height of the collimating layer 30 can be reduced. Therefore, the production yield can be improved, and the manufacturing cost and thickness of the fingerprint sensing module can also be reduced.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical fingerprint sensing module for sensing a fingerprint pattern of a finger placed on an upper surface of a display panel module, wherein light is generated by the display panel module and reflected by the finger, the optical fingerprint sensing module comprising:
   a substrate;
   an image sensor, disposed above the substrate;
   a collimating layer, disposed above the image sensor and comprising a plurality of collimating holes;
   a light permeable layer, disposed above the collimating layer;
   a pinhole layer, disposed on the light permeable layer and comprising a plurality of pinholes, wherein the number of collimating holes is greater than the number of pinholes, and light is reflected by the finger and then sequentially propagates through the pinholes, the light permeable layer, and the collimating holes to reach the image sensor.

2. The optical fingerprint sensing module as claimed in claim 1, wherein each of the pinholes has a diameter W1, and each of the collimating holes has a diameter W2, wherein W1≥W2.

3. The optical fingerprint sensing module as claimed in claim 2, wherein a distance H is formed between a top surface of the pinhole layer and a bottom surface of the collimating layer, and the collimating layer has a height H5, wherein the ratio of H to H5 is from 5 to 8.

4. The optical fingerprint sensing module as claimed in claim 3, wherein the ratio of H to W2 is from 80 to 120.

5. The optical fingerprint sensing module as claimed in claim 3, wherein the ratio of H5 to W2 is from 10 to 50.

6. The optical fingerprint sensing module as claimed in claim 1, wherein the pitch of the pinholes is greater than the pitch of the collimating holes.

7. The optical fingerprint sensing module as claimed in claim 1, wherein the pitch of the pinholes is from 20 um to 50 um.

8. The optical fingerprint sensing module as claimed in claim 1, further comprising an optical film disposed between the collimating layer and the image sensor.

9. The optical fingerprint sensing module as claimed in claim 8, wherein the optical film is an infrared cut-off filter film.

10. The optical fingerprint sensing module as claimed in claim 1, wherein the image sensor comprises a plurality of pixel units, and each of the pixel units comprises at least a photosensitive element, wherein the number of pinholes is equal to the number of pixel units.

11. The optical fingerprint sensing module as claimed in claim 1, wherein the pinhole layer comprises metal or black photoresist.

12. The optical fingerprint sensing module as claimed in claim 1, further comprising a plurality of micro-lenses disposed on the light permeable layer and respectively received in the pinholes.

13. The optical fingerprint sensing module as claimed in claim 1, wherein the pinhole layer is formed on the light permeable layer by Chemical Vapor Deposition (CVD), evaporation, sputtering, coating, dispensing, electroplating, or electroless plating.

14. The optical fingerprint sensing module as claimed in claim 1, wherein the display panel module may be an Organic Light-Emitting Diode (OLED) display module or TFT-LCD module.

\* \* \* \* \*